(12) United States Patent
Matsunaga (10) Patent No.: US 12,467,824 B2
(45) Date of Patent: Nov. 11, 2025

(54) INSPECTION METHOD FOR OPTICAL FIBER, INSPECTION DEVICE FOR OPTICAL FIBER, AND METHOD FOR MANUFACTURING OPTICAL FIBER-WOUND BOBBIN

(71) Applicant: Fujikura Ltd., Tokyo (JP)

(72) Inventor: Satoshi Matsunaga, Sakura (JP)

(73) Assignee: Fujikura Ltd., Tokyo (JP)

( * ) Notice: Subject to any disclaimer, the term of this patent is extended or adjusted under 35 U.S.C. 154(b) by 131 days.

(21) Appl. No.: 18/017,252

(22) PCT Filed: Jul. 13, 2021

(86) PCT No.: PCT/JP2021/026231
§ 371 (c)(1),
(2) Date: Jan. 20, 2023

(87) PCT Pub. No.: WO2022/019176
PCT Pub. Date: Jan. 27, 2022

(65) Prior Publication Data
US 2024/0035924 A1    Feb. 1, 2024

(30) Foreign Application Priority Data
Jul. 21, 2020   (JP) ................. 2020-124553

(51) Int. Cl.
*G01M 11/00*   (2006.01)

(52) U.S. Cl.
CPC .................. *G01M 11/30* (2013.01)

(58) Field of Classification Search
CPC ............. G01M 11/30; G01M 11/088; G01N 2021/9511; G01N 21/958; G01N 21/956; G01B 11/00; G01B 11/26
See application file for complete search history.

(56) References Cited

U.S. PATENT DOCUMENTS

2015/0009320 A1   1/2015 Klein et al.
2015/0070688 A1*  3/2015 Mejouev .............. G01M 11/088
                                              356/73.1
(Continued)

FOREIGN PATENT DOCUMENTS

CH         704499 B1    8/2012
CN     101290296 A    10/2008
(Continued)

OTHER PUBLICATIONS

International Search Report issued in corresponding International Application No. PCT/JP2021/026231, dated Sep. 21, 2021 (3 pages).

*Primary Examiner* — Maurice C Smith
(74) *Attorney, Agent, or Firm* — Osha Bergman Watanabe & Burton LLP (57) ABSTRACT

An inspection method, for an optical fiber including a bare optical fiber and a light-transmitting coating layer that coats an outer peripheral surface of the bare optical fiber, includes: irradiating, with illumination light having directivity, an outer peripheral surface of a wound body that includes the optical fiber wound in multiple layers around a bobbin; receiving the illumination light reflected by the wound body and generating image data containing at least a part of an image of the illumination light; and determining, based on the image data, whether a stripe pattern is projected in the image. The stripe pattern is a state in which the illumination light repeatedly changes along a winding direction of the optical fiber.

11 Claims, 6 Drawing Sheets

(56) References Cited

U.S. PATENT DOCUMENTS

| | | | |
|---|---|---|---|
| 2019/0049372 A1 | 2/2019 | Kohda et al. | |
| 2023/0150870 A1* | 5/2023 | Enomoto | C03C 25/105 65/382 |

FOREIGN PATENT DOCUMENTS

| | | | | |
|---|---|---|---|---|
| CN | 105745523 | A | 7/2016 | |
| CN | 106461568 | A | 2/2017 | |
| CN | 108414524 | A | 8/2018 | |
| CN | 108885182 | A | 11/2018 | |
| GB | 2249832 | A | 5/1992 | |
| JP | H02221068 | A | 9/1990 | |
| JP | H07311158 | A | 11/1995 | |
| JP | H08285559 | A | 11/1996 | |
| JP | H09145542 | A | 6/1997 | |
| JP | H10246616 | A | 9/1998 | |
| JP | H10267859 | A | 10/1998 | |
| JP | H11132964 | A | 5/1999 | |
| JP | 2002350360 | A | 12/2002 | |
| JP | 2007309690 | A | 11/2007 | |
| JP | 2012173194 | A | 9/2012 | |
| JP | 2016085138 | A | 5/2016 | |
| JP | 2016530540 | A | 9/2016 | |
| JP | 2018144215 | A | 9/2018 | |
| JP | 6585056 | B2 | 10/2019 | |
| JP | 2020016798 | A | 1/2020 | |
| KR | 202000953 | * | 1/2020 | G03F 9/7049 |
| WO | WO-2013117497 | A1 * | 8/2013 | G01M 11/30 |

* cited by examiner

INSPECTION METHOD FOR OPTICAL FIBER, INSPECTION DEVICE FOR OPTICAL FIBER, AND METHOD FOR MANUFACTURING OPTICAL FIBER-WOUND BOBBIN

TECHNICAL FIELD

The present invention relates to an inspection method for an optical fiber, an inspection device for an optical fiber, and a method for manufacturing an optical fiber-wound bobbin.

BACKGROUND

As one of optical fibers, an optical fiber in which an outer peripheral surface of a bare optical fiber is coated with a coating layer has been known. In general, optical fibers are inspected before shipping. As inspections for optical fibers, an optical property inspection using an optical time domain reflectometer (OTDR) or the like and an inspection for a defect such as a scratch on a coating layer are known, for example. For example, Patent Literature 1 discloses an inspection method for detecting a defect in a coating layer.

In the inspection method disclosed in Patent Literature 1, a wound body in which an optical fiber is wound in multiple layers around a bobbin is irradiated with light, image data of an image of the light reflected by the wound body is captured, and image processing is performed on the image data, thereby detecting defects such as bubbles in a coating layer.

[Patent Literature 1] JP 6585056 B

The inspection method disclosed in Patent Literature 1 is to detect defects such as bubbles in a coating layer, that is, to detect defects that partially occur in the longitudinal direction of an optical fiber. However, some defects in a coating layer occur continuously in the longitudinal direction of an optical fiber. Such defects include, for example, an interface, such as an outer peripheral surface of a coating layer, becoming a wavy curved surface along the longitudinal direction of an optical fiber, and there is a demand for detecting such a defect.

SUMMARY

One or more embodiments of the present invention relate to an inspection method for an optical fiber, an inspection device for an optical fiber, and a method for manufacturing an optical fiber-wound bobbin that are capable of detecting a defect continuously occurring in a longitudinal direction of the optical fiber.

In one or more embodiments, an inspection method, for an optical fiber including a bare optical fiber and a light-transmitting coating layer coating an outer peripheral surface of the bare optical fiber, includes an irradiation step of irradiating, with illumination light having directivity, an outer peripheral surface of a wound body obtained by the optical fiber wound in multiple layers around a bobbin, an image data generation step of receiving the illumination light reflected by the wound body and generating image data containing at least a part of an image of the illumination light, and an inspection step of determining, based on the image data, whether a stripe pattern in which a state of the illumination light repeatedly changes along a winding direction of the optical fiber is projected in the image.

In one or more embodiments, an inspection device for an optical fiber includes an illumination unit that irradiates, with illumination light having directivity, an outer peripheral surface of a wound body obtained by the optical fiber wound in multiple layers around a bobbin, the optical fiber including a bare optical fiber and a light-transmitting coating layer coating an outer peripheral surface of the optical fiber bare wire, an image data generation unit that receives the illumination light reflected by the wound body and generates image data containing at least a part of an image of the illumination light, and an inspection unit that determines, based on the image data, whether a stripe pattern in which a state of the illumination light repeatedly changes along a winding direction of the optical fiber is projected in the image.

In the inspection method and inspection device, the outer peripheral surface of the wound body is irradiated with illumination light having directivity, and image data containing at least a part of an image of the illumination light reflected by the wound body is generated. The inventor has found that when an interface in the coating layer is a wavy curved surface along the longitudinal direction of the optical fiber, a stripe pattern in which the state of the illumination light, such as color and intensity, repeatedly changes along the winding direction of the optical fiber can be projected in the image of the illumination light in the image data generated as described above. The reasons for this are not certain, but are assumed as follows. The outer peripheral surface of the wound body is an outer peripheral surface of the coating layer at an outermost portion positioned in the outermost layer of the wound body in the optical fiber, and is an outer interface in the coating layer. Of the illumination light reflected by the interface in the coating layer at this portion of the optical fiber, the light reflected at a recessed portion and the light reflected at a protruding portion adjacent to the recessed portion have different propagation path lengths. When specific light whose wavelength is an integer multiple of this path length difference is included in the illumination light, the specific light reflected at the recessed portion and the specific light reflected at the protruding portion interfere with each other to intensify each other. The path length difference changes depending on the height of the unevenness, and generally the height of the unevenness is not constant in the longitudinal direction of an optical fiber. In addition, the winding direction of the optical fiber in the wound body is the same as the longitudinal direction of the wound portion in the optical fiber. Therefore, it is possible to assume that the interference intermittently occurs in the winding direction of the optical fiber to form a stripe pattern in which the state of the illumination light, such as color and intensity, repeatedly changes along the winding direction of the optical fiber in the image of the reflected illumination light.

In addition, in the inspection method and inspection device, since the coating layer has translucency, the illumination light is also incident on an inner portion positioned inside the outermost layer of the wound body in the optical fiber. Therefore, it is possible to assume that the illumination light is reflected also on the interface in the coating layer at the inner portion similarly to the outermost portion to form a stripe pattern in the image of the reflected illumination light. It is possible to assume that the illumination light reflected at the inner portion and the illumination light reflected at the outermost portion overlap each other to form a stripe pattern in which the state of the illumination light, such as color and intensity, repeatedly changes along the winding direction of the optical fiber in the entire image of the illumination light. In addition, since the illumination light is reflected at the outermost portion and the inner portion in the optical fiber, the quantity of the illumination light reflected by the wound body is larger than that when the optical fiber is wound in a single layer. Therefore, in the inspection method and inspection device, it is possible to assume that the stripe pattern can be recognizably projected in the image data containing the entire image of the illumination light. In the inspection method and inspection device, it is determined whether the stripe pattern is projected based on the image data. Therefore, with the inspection method and inspection device, it is possible to detect a defect that occurs continuously in the longitudinal direction of the optical fiber and that the interface in the coating layer is a wavy curved surface.

In the above inspection method, an angle formed between a direction in which the wound body is irradiated with the illumination light in the irradiation step and a direction in which the illumination light reflected by the wound body is received in the image data generation step may be 30° or less.

In the inspection method, when the angle formed between the direction in which the wound body is irradiated with the illumination light in the irradiation step and the direction in which the illumination light reflected by the wound body is received in the image data generation step is $\varphi(°)$, a wavelength band of the illumination light may include a specific wavelength band having a width of 200 nm or more in a predetermined wavelength band WB (nm) represented by following expressions (1) and (2).

$$WB \geq 2 \cdot 0.1 \times 10^3 \cdot \sin((180°-\varphi)/2)/1 \quad (1)$$

$$WB \leq 2 \cdot 1.0 \times 10^3 \cdot \sin((180°-\varphi)/2)/3 \quad (2)$$

The inventor has found that, with such a configuration, when the interface in the coating layer is a wavy surface including unevenness having a height of 0.1 μm or more and 1.0 μm or less, a stripe pattern can be formed in the image of the illumination light in the image data. Therefore, with the inspection method according to one or more embodiments, it is possible to detect that the interface in the coating layer is such a wavy surface.

In this case, the specific wavelength band may have a width of 300 nm or more in the predetermined wavelength band WB.

The inventor has found that, with such a configuration, when the interface in the coating layer is a wavy surface including unevenness having a height of 0.1 μm or more and 1.0 μm or less, a stripe pattern can be more likely to be formed in the image of the illumination light in the image data. Therefore, with the inspection method, it is possible to more properly detect that the interface in the coating layer is such a wavy surface.

In the above inspection method, the coating layer may have a multilayer structure.

With such a configuration, the illumination light applied to the wound body can be reflected on the interfaces between a plurality of layers constituting the coating layer. Therefore, when the interfaces between the layers are wavy curved surfaces along the longitudinal direction of the optical fiber, a stripe pattern formed due to the unevenness can be included in the image of the illumination light reflected by the wound body. Accordingly, with the inspection method, it is possible to detect that the interfaces in the plurality of layers constituting the coating layer are wavy curved surfaces.

A method for manufacturing an optical fiber-wound bobbin according to one or more embodiments of the present invention includes a winding process of winding an optical fiber including a bare optical fiber and a light-transmitting coating layer coating an outer peripheral surface of the bare optical fiber around a bobbin in multiple layers, and an inspection process of inspecting the optical fiber wound around the bobbin by the inspection method for the optical fiber.

As described above, one or more embodiments of the present invention provide an inspection method for an optical fiber, an inspection device for an optical fiber, and a method of manufacturing an optical fiber-wound bobbin that are capable of inspecting a defect continuously occurring in a longitudinal direction of an optical fiber.

DETAILED DESCRIPTION

Hereinafter, one or more embodiments for carrying out an inspection method for an optical fiber, an inspection device for an optical fiber, and a method for manufacturing an optical fiber-wound bobbin according to one or more embodiments of the present invention will be described in detail with reference to the drawings. The embodiments exemplified below are intended to facilitate understanding of the present invention and are not intended to limit the present invention. Embodiments of the present invention can be modified and improved without departing from the gist thereof. In the drawings referred to below, dimensions of each member can be changed to facilitate understanding.

Figure 1:
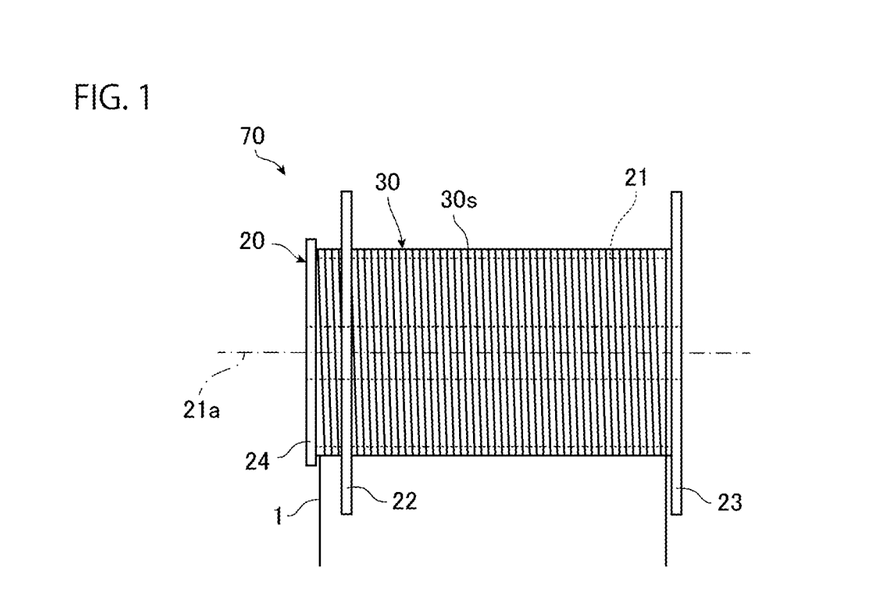
FIG. 1 is a diagram schematically showing a wound body in which an optical fiber to be inspected by an inspection method for an optical fiber according to one or more embodiments of the present invention is wound around a bobbin.

FIG. 1 is a diagram schematically showing a wound body in which an optical fiber to be inspected by an inspection method for an optical fiber according to one or more embodiments is wound around a bobbin, and is a diagram schematically showing an optical fiber-wound bobbin including a bobbin and an optical fiber wound around the bobbin. As shown in FIG. 1, a bobbin 20 according to one or more embodiments includes a cylindrical shaft 21, a first flange 22, a second flange 23, and a rib 24. The second flange 23 is provided at one end of the shaft 21, the rib 24 is provided at the other end of the shaft 21, and the first flange 22 is provided between the second flange 23 and the rib 24.

One side of an optical fiber 1 in the longitudinal direction is wound in multiple layers between the first flange 22 and the second flange 23 of the shaft 21. The other side of the optical fiber 1 in the longitudinal direction is led out between the first flange 22 and the rib 24 of the shaft 21 through a notch (not shown) provided in the first flange 22, and is wound in multiple layers around this portion. As described above, the optical fiber 1 is wound in multiple layers around the bobbin 20 to form a wound body 30, and the bobbin 20 and the optical fiber 1 constitute an optical fiber-wound bobbin 70. In a cross section along a central axis 21a of the shaft 21, the optical fiber 1 is aligned in a direction parallel to the central axis 21a and in a direction perpendicular to the central axis 21a.

Note that the wound body 30 is not particularly limited as long as the optical fiber 1 is wound in multiple layers around the bobbin 20. For example, the wound body 30 may be constituted by the optical fiber 1 wound in multiple layers only between the first flange 22 and the second flange 23 of the shaft 21. In this case, the rib 24 may not be formed on the shaft 21, and the first flange 22 may be positioned at the end of the shaft 21 opposite to the second flange 23.

Figure 2:
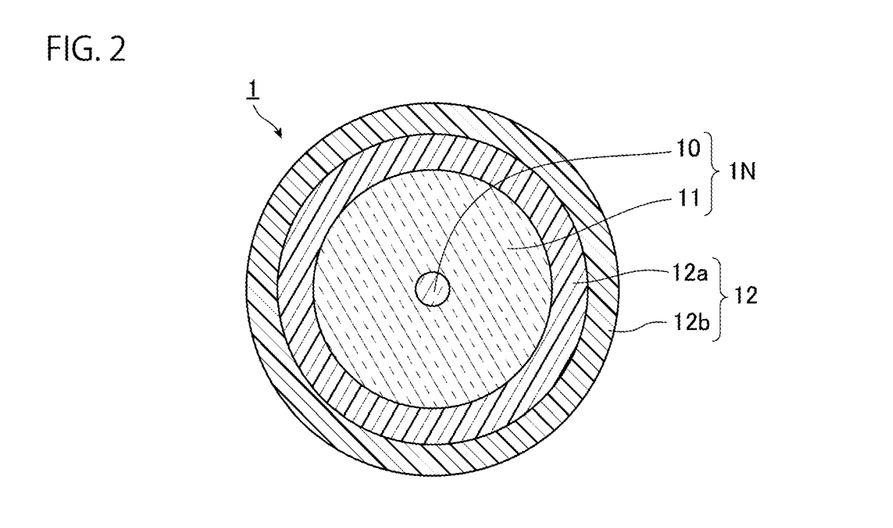
FIG. 2 is a diagram showing a cross section perpendicular to a longitudinal direction of the optical fiber shown in FIG. 1.

FIG. 2 is a diagram showing a cross section perpendicular to the longitudinal direction of the optical fiber 1 shown in FIG. 1. As shown in FIG. 2, the optical fiber 1 includes a bare optical fiber 1N and a coating layer 12 coating the outer peripheral surface of the bare optical fiber 1N. The bare optical fiber 1N according to one or more embodiments includes a core 10 and a cladding 11 surrounding the outer peripheral surface of the core 10. The outer shape of the core 10 in a cross section perpendicular to the longitudinal direction of the optical fiber 1 is circular, and the core 10 is positioned in the center of the cladding 11. Note that the outer shape of the cladding 11 in this cross section may be a non-circular shape, such as an elliptical shape or a polygonal shape, and the bare optical fiber 1N may include a plurality of cores 10.

The refractive index of the core 10 is set to be higher than the refractive index of the cladding 11. In one or more embodiments, the core 10 is made of silica glass doped with a dopant that increases the refractive index, such as germanium (Ge), and the cladding 11 is made of silica glass without any additive. Note that the core 10 may be made of silica glass doped with a dopant that increases the refractive index, and the cladding 11 may be made of silica glass doped with a dopant that decreases the refractive index, such as fluorine (F). Alternatively, the core 10 may be made of silica glass without any additive, and the cladding 11 may be made of silica glass doped with a dopant that increases the refractive index.

The coating layer 12 is made of a light-transmitting resin that transmits at least illumination light described later. The resin forming the coating layer 12 is, for example, a thermosetting resin or an ultraviolet curable resin. In one or more embodiments, the coating layer 12 does not contain a coloring pigment and has a two-layer structure including an inner layer 12a coating the outer peripheral surface of the cladding 11 and an outer layer 12b coating the outer peripheral surface of the inner layer 12a. Note that the number of layers in the coating layer 12 is not particularly limited, and the coating layer 12 may have a multilayer structure including three or more resin layers, or may have a single layer structure including one resin layer coating the outer peripheral surface of the cladding 11.

Next, an inspection device for the optical fiber 1 according to one or more embodiments is described.

Figure 3:
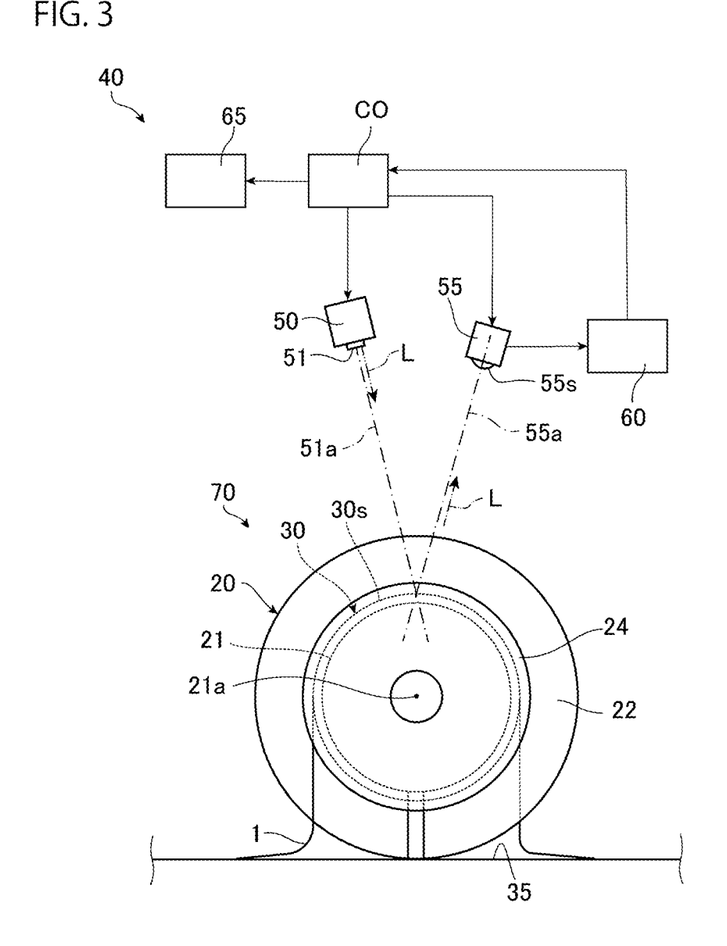
FIG. 3 is a diagram schematically showing an inspection device according to one or more embodiments.

FIG. 3 is a diagram schematically showing an inspection device according to one or more embodiments, and is a diagram when viewed from a direction parallel to the central axis 21a of the shaft 21 of the bobbin 20. As shown in FIG. 3, an inspection device 40 mainly includes an illumination unit 50, an image data generation unit 55, an inspection unit 60, a display unit 65, and a control unit CO. The optical fiber-wound bobbin 70 is placed on a placing surface 35 in such a manner that outer edges of the first flange 22 and the second flange 23 are in contact with the placing surface 35, and the inspection device 40 detects a defect in the coating layer 12 of the optical fiber 1 constituting the wound body 30.

As the control unit CO, an integrated circuit, such as a microcontroller, an integrated circuit (IC), a large-scale integrated circuit (LSI), or an application specific integrated circuit (ASIC), or a numerical control (NC) device can be employed. In addition, when the NC device is employed, the control unit CO may use a machine learning device or may not use a machine learning device. As described below, some components of the inspection device 40 are controlled by the control unit CO.

Figure 4:
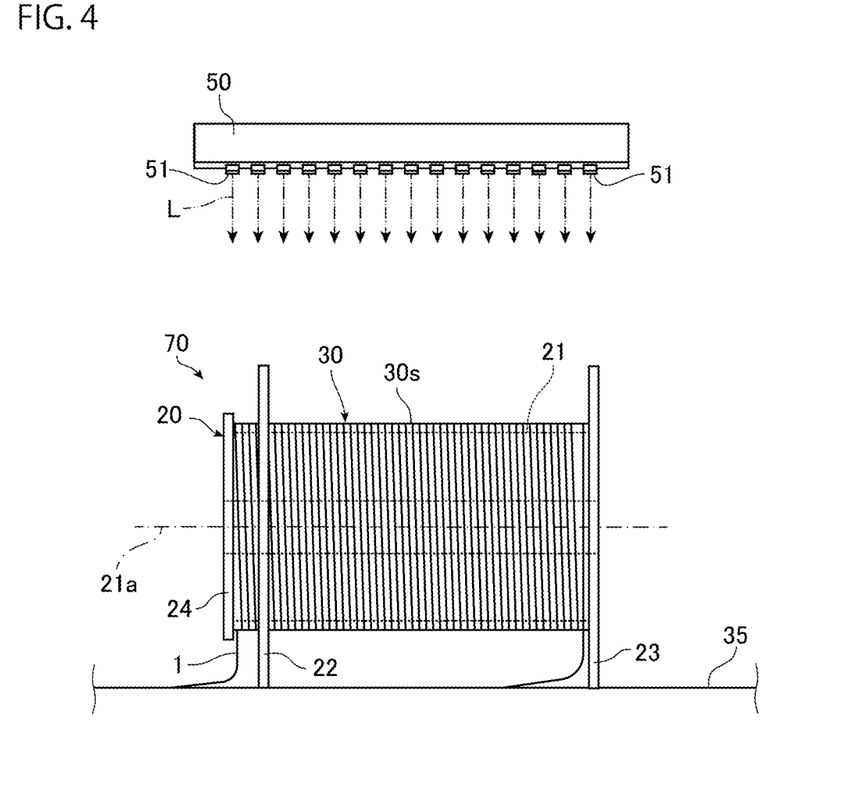
FIG. 4 is a diagram showing an optical fiber-wound bobbin and an illumination unit viewed from a direction different from FIG. 3.

The illumination unit 50 (light source) is configured to irradiate an outer peripheral surface 30s of the wound body 30 with illumination light L having directivity. FIG. 4 is a diagram showing the optical fiber-wound bobbin 70 and the illumination unit 50 viewed from a direction different from FIG. 3, and is a diagram when viewed from a direction perpendicular to the central axis 21a of the shaft 21 and parallel to the horizontal direction. As shown in FIGS. 3 and 4, the illumination unit 50 is a bar illumination including a plurality of light sources 51 arranged in a direction parallel to the central axis 21a in one or more embodiments. The illumination unit 50 is disposed above the wound body 30 in such a manner that an intersection between an optical axis 51a of each light source 51 and the outer peripheral surface 30s of the wound body 30 is positioned on the central axis 21a or in the vicinity of the central axis 21a when the wound body 30 is viewed from above. Note that the angle formed between the tangent of the outer peripheral surface 30s and the optical axis 51a at the intersection may be 30° or less. In FIG. 4, the optical axis 51a is omitted. The illumination unit 50 emits the illumination light L from each light source 51 in accordance with a control signal from the control unit CO, and irradiates the outer peripheral surface 30s of the wound body 30 with the illumination light L. In one or more embodiments, the area of the outer peripheral surface 30s irradiated with the illumination light L has a linear shape extending in a direction substantially parallel to the central axis 21a and substantially perpendicular to the winding direction of the optical fiber 1, and crosses the upper area of the outer peripheral surface 30s. A part of the illumination light L applied to the wound body 30 in this manner is reflected by the wound body 30.

Note that light having directivity is, for example, light within a directivity angle of ±40° or less in light emitted from a light source having the directivity angle, and the directivity angle is sometimes referred to as a half-value angle or a half-power angle. The optical axis 51a of each light source 51 is a straight line that is parallel to the emission direction of the light having the strongest intensity among the light emitted from the light sources 51 and passes through the portion from which the light is emitted. The light sources 51 according to one or more embodiments are LEDs and emit the white illumination light L having directivity, but the color of the illumination light L is not particularly limited.

Note that the illumination unit 50 is only required to irradiate the outer peripheral surface 30*s* of the wound body 30 with the illumination light L having directivity, and the configuration of the illumination unit 50, the range of the wavelength band of the illumination light L, and the type of the light sources 51 are not particularly limited. For example, the illumination unit 50 may further include collimating lenses corresponding to the light sources 51, and collimate the light emitted from each light source 51 with the collimating lens. In addition, the illumination unit 50 may further include a light shielding plate formed with a slit and covering the light sources 51. In this case, the slit has a shape through which a part of the light emitted from the light sources 51 passes, and the light having passed the slit has the above directional angle.

The image data generation unit 55 (imaging sensor) includes an imaging element (not shown) in which a plurality of light receiving elements is arranged, and is configured to generate image data of an image of light incident from an incident surface 55*s* that captures the light and projected on a light receiving surface of the imaging element. The image data contains a plurality of pieces of pixel data indicating the intensity, color, and the like of the light received by the respective light receiving elements, and is information indicating the distribution of the intensity, color, and the like of the light incident on the light receiving surface of the imaging element. The image data generation unit 55 is, for example, a camera including a CCD image sensor or a CMOS image sensor as the imaging element. The image data generation unit 55 is disposed in such a manner that the illumination light L reflected by the wound body 30 enters the light receiving surface of the imaging element and an image of the illumination light L is projected on the light receiving surface. In one or more embodiments, the image data generation unit 55 is configured to generate two-dimensional image data, and is disposed above the wound body 30. A straight line 55*a* that passes through the center of the incident surface 55*s* and is perpendicular to the incident surface 55*s* passes through the area irradiated with the illumination light L on the outer peripheral surface 30*s* of the wound body 30. An intersection between this area and the straight line 55*a* is positioned between the first flange 22 and the second flange 23. Therefore, at least a part of the image of the illumination light L reflected between the first flange 22 and the second flange 23 of the wound body 30 is projected on the light receiving surface. In addition, the angle formed between the straight line 55*a* and the optical axis 51*a* of each light source 51 when viewed along the central axis 21*a* is 30° or less. This means that the angle formed between the direction in which the illumination unit 50 irradiates the wound body 30 with the illumination light L and the direction in which the image data generation unit 55 receives the illumination light L reflected by the wound body 30 is 30° or less.

Note that the image data generation unit 55 is only required to be able to generate image data containing at least a part of the image of the illumination light L reflected by the wound body 30, and the configuration, disposition, and orientation of the image data generation unit 55 are not particularly limited. For example, the image data generation unit 55 may be configured to be able to generate image data containing the entire image of the illumination light L reflected by the wound body 30. In addition, the angle formed between the direction in which the illumination unit 50 irradiates the wound body 30 with the illumination light L and the direction in which the image data generation unit 55 receives the illumination light L reflected by the wound body 30 may be 30° or more.

The inspection unit 60 according to one or more embodiments determines whether there is a defect in the coating layer 12 of the optical fiber 1 based on the image data input from the image data generation unit 55, and outputs an electric signal corresponding to the determination to the control unit CO. The inspection unit 60 according to one or more embodiments performs this determination using a learning model constructed in advance by machine learning, and this determination will be described later. The configuration of the inspection unit 60 is, for example an integrated circuit, similar to the configuration of the control unit CO.

The display unit 65 displays an inspection result based on the determination by the inspection unit 60 as to whether there is a defect. The display unit 65 is, for example, a liquid crystal display.

Next, an inspection method for the optical fiber 1 according to one or more embodiments is described.

Figure 5:
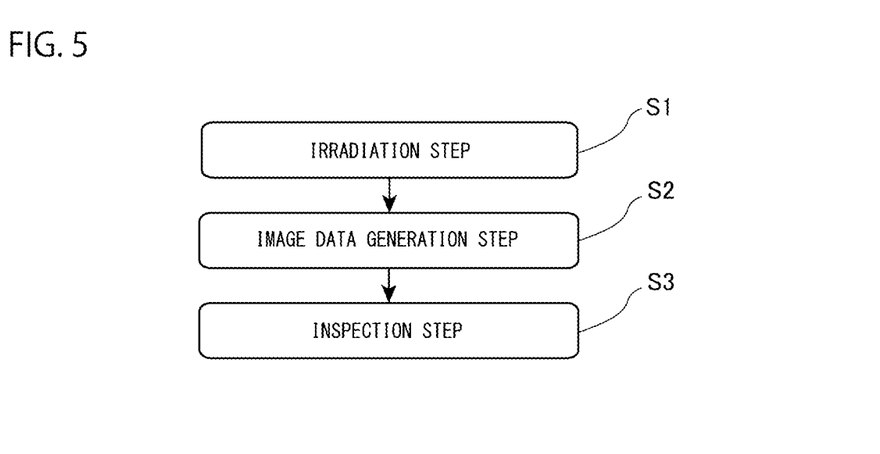
FIG. 5 is a flowchart showing a procedure of an inspection method for the optical fiber according to one or more embodiments.

FIG. 5 is a flowchart showing a procedure of an inspection method for the optical fiber 1 according to one or more embodiments. As shown in FIG. 5, the inspection method for the optical fiber 1 according to one or more embodiments includes an irradiation step S1, an image data generation step S2, and an inspection step S3.

<Irradiation Step S1>

This step is a step of irradiating the outer peripheral surface 30*s* of the wound body 30 with the illumination light L having directivity. In one or more embodiments, the illumination unit 50 emits the illumination light L from the light sources 51 in accordance with a control signal from the control unit CO, and irradiates the outer peripheral surface 30*s* of the wound body 30 with the illumination light L. A part of the illumination light L is reflected by the wound body 30.

<Image Data Generation Step S2>

This step is a step of receiving the illumination light L reflected by the wound body 30 and generating image data containing at least a part of the image of the illumination light L. In one or more embodiments, the image data generation unit 55 is disposed in such a manner that at least a part of the image of the illumination light L reflected by the wound body 30 is projected on the light receiving surface of the imaging element, as described above. The image data generation unit 55 generates image data containing at least a part of the image of the illumination light L reflected by the wound body 30 in accordance with a signal from the control unit CO, and outputs the image data to the inspection unit 60.

The inventor has found that when the interface in the coating layer 12 of the optical fiber 1 is a wavy curved surface along the longitudinal direction of the optical fiber 1, the image of the illumination light in the image data generated as described above can have a stripe pattern in which the state of the illumination light repeatedly changes along the winding direction of the optical fiber 1.

Figure 6:
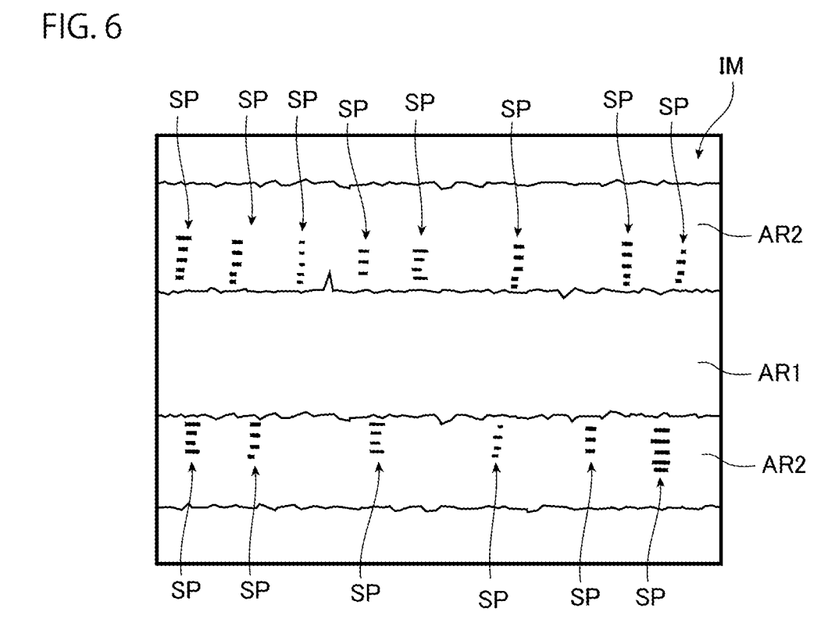
FIG. 6 is a diagram schematically showing an example of an image containing a part of an image of illumination light reflected by the wound body.

FIG. 6 is a diagram schematically showing an example of an image containing a part of the image of the illumination light L reflected by the wound body 30, and a diagram showing that a stripe pattern is projected in the image. This image is based on the image data generated by the image data generation unit 55, and the winding direction of the optical fiber 1 is substantially parallel to the vertical direction in FIG. 6. In an image IM of the illumination light L shown in FIG. 6, an area AR1 is the area having the highest light intensity, and an area AR2 is the area having a lower light intensity than the area AR1. The color of these areas AR1 and AR2 is generally white. The area AR1 is sandwiched between the areas AR2 in the winding direction of the optical fiber 1. In the areas AR2, a plurality of stripe patterns SP is formed. These stripe patterns SP are stripe patterns in which the state of the illumination light L, such as color and intensity, repeatedly changes along the winding direction of the optical fiber 1.

Figure 7:
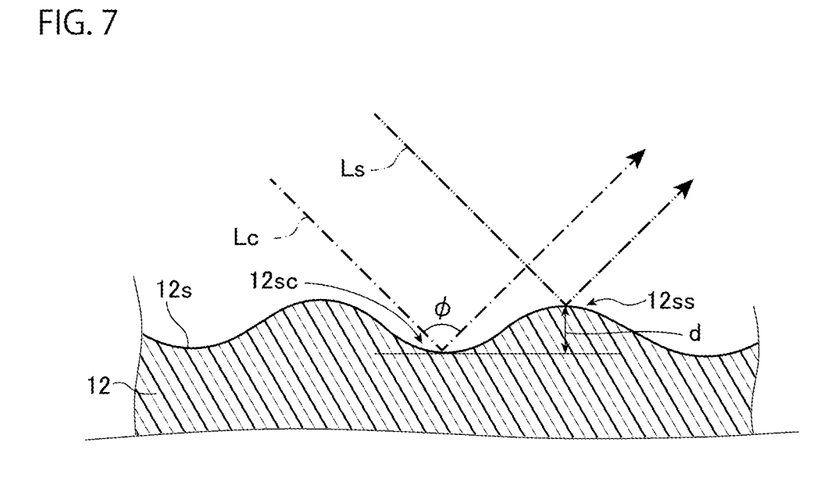
FIG. 7 is a cross-sectional view schematically showing the reflection of illumination light in the wound body.

The reasons why the stripe patterns SP are projected is not certain, but are assumed as follows. FIG. 7 is a cross-sectional view schematically showing the reflection of the illumination light L in the wound body 30, is an enlarged cross-sectional view showing the vicinity of the outer peripheral surface 30s of the wound body 30, and is a cross-sectional view along the winding direction of the optical fiber 1. The outer peripheral surface 30s of the wound body 30 is an outer peripheral surface 12s of the coating layer 12 at an outermost portion positioned in the outermost layer of the wound body 30 in the optical fiber 1, and the outer peripheral surface 12s is an outer interface in the coating layer 12. As shown in FIG. 7, of the illumination light L reflected on the outer peripheral surface 12s at the outermost portion, light Lc reflected at a recessed portion 12sc and light Ls reflected at a protruding portion 12ss adjacent to the recessed portion 12sc have different propagation path lengths. Assuming that the angle obtained by adding the entrance angle and the reflection angle of each of the light Lc and Ls is $\varphi(°)$ and that the height of the unevenness is d (μm), the difference between the path lengths of the light Lc and the light Ls is approximately $2 d \cdot \sin((180°-\varphi)/2)$. Since the image data generation unit 55 receives the illumination light L reflected by the wound body 30, the angle $\varphi$ can be understood as the angle formed between the direction in which the illumination unit 50 irradiates the wound body 30 with the illumination light L and the direction in which the image data generation unit 55 receives the illumination light L reflected by the wound body 30. Assuming that the wavelength of the light Lc and Ls is $\lambda$ (nm), the light Lc and the light Ls interfere with each other to intensify each other when the path length difference has the relationship in the following Expression (3). Note that n is a natural number.

$$n\lambda = 2d \cdot \sin((180°-\varphi)/2) \quad (3)$$

That is, when the path length difference is an integer multiple of the wavelength of the light Lc and Ls, in other words, when the illumination light L includes the light Lc and Ls having such a wavelength, the light Lc and the light Ls interfere with each other to intensify each other.

The path length difference changes depending on the height d of the unevenness, and generally the height d of the unevenness is not constant in the longitudinal direction of an optical fiber. In addition, the winding direction of the optical fiber 1 in the wound body 30 is the same as the longitudinal direction of the wound portion in the optical fiber 1. Therefore, it is possible to assume that the interference intermittently occurs in the winding direction of the optical fiber 1 to form a stripe pattern in which the state of the illumination light L, such as color and intensity, repeatedly changes along the winding direction of the optical fiber in the image of the reflected illumination light L.

In one or more embodiments, since the coating layer 12 has translucency, the illumination light L is also incident on an inner portion positioned inside the outermost portion positioned in the outermost layer of the wound body 30 in the optical fiber 1. Therefore, it is possible to assume that the illumination light L is reflected also on the outer peripheral surface 12s, which is the interface in the coating layer 12 at the inner portion, similarly to the outermost portion to form a stripe pattern in the image of the reflected illumination light L. It is possible to assume that the illumination light L reflected at the inner portion and the illumination light L reflected at the outermost portion overlap each other to form, in the entire image of the illumination light L, a stripe pattern in which the state of the illumination light L, such as color and intensity, repeatedly changes along the winding direction of the optical fiber. In addition, since the illumination light L is reflected at the outermost portion and the inner portion in the optical fiber 1, the quantity of the illumination light L reflected by the wound body 30 is larger than that when the optical fiber 1 is wound in a single layer. Therefore, in one or more embodiments, it is possible to assume that the stripe pattern can be recognizably projected in image data containing the entire image of the illumination light L.

Here, according to the above Expression (3), the height d of the unevenness where such interference occurs depends on the wavelength of the light Lc and Ls. As described above, generally the height d of the unevenness is not constant in the longitudinal direction of an optical fiber, and the illumination light L applied to the wound body 30 is white in one or more embodiments. Therefore, a stripe pattern by, for example, blue light or red light can be projected in the image data. Therefore, a stripe pattern in which the color repeatedly changes along the winding direction of the optical fiber 1 can be projected in the image data. For example, if the illumination light L is blue, a stripe pattern in which the intensity of blue light repeatedly increases and decreases along the winding direction of the optical fiber 1 can be projected in the image data.

<Inspection Step S3>

This step is a step of determining, based on the image data generated in the image data generation step S2, whether the stripe pattern SP in which the state of the illumination light L repeatedly changes along the winding direction of the optical fiber 1 is projected in the image IM of the illumination light L reflected by the wound body 30. In one or more embodiments, the inspection unit 60 determines whether the stripe pattern SP is projected using a learning model constructed in advance by machine learning. The learning model according to one or more embodiments is constructed by a plurality of pieces of image data generated in a similar manner to the above image data generation step S2, that is, a plurality of pieces of training image data in which the stripe pattern SP caused due to the outer peripheral surface 12s of the coating layer 12 being a wavy curved surface is projected. Therefore, machine learning for constructing this learning model is supervised learning. When determining that the stripe pattern SP is projected in the image IM of the illumination light L in the image data generated in the image data generation step S2, the inspection unit 60 outputs a signal indicating that the coating layer 12 has a defect to the control unit CO. On the other hand, when determining that the stripe pattern SP is not projected, the inspection unit 60 outputs a signal indicating that there is no defect in the coating layer 12 to the control unit CO.

Note that the training image data is not particularly limited. The training image data is, for example, image data generated using the wound body 30 formed by the optical fiber 1 not having a wavy curved surface that makes the outer peripheral surface of the coating layer 12 defective, and may further include a plurality of pieces of non-defective product image data in which the stripe pattern SP is not projected in the image IM of the illumination light L. In addition, by appropriately changing the training image data, the determination criterion in order for the inspection unit 60 to determine whether the stripe pattern SP is projected can be adjusted, and the inspection unit 60 can determine that the stripe pattern SP is projected when, for example, the change amount of the light intensity in the stripe pattern SP is greater than a predetermined amount.

The control unit CO outputs a control signal corresponding to the signal input from the inspection unit 60 to the display unit 65 to cause the display unit 65 to display the inspection result. In this manner, the outer peripheral surface 12s that is the interface in the coating layer 12 is inspected for a wavy curved surface along the longitudinal direction of the optical fiber 1, that is, for a defect in the coating layer 12 of the optical fiber 1.

Next, a method for manufacturing the optical fiber-wound bobbin according to one or more embodiments is described.

Figure 8:
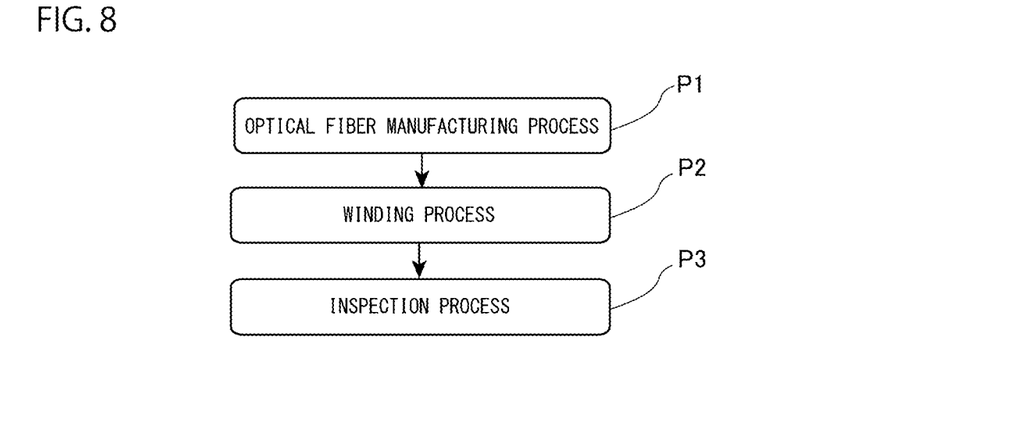
FIG. 8 is a flowchart showing processes of a method for manufacturing the optical fiber-wound bobbin according to one or more embodiments.
Figure 9:
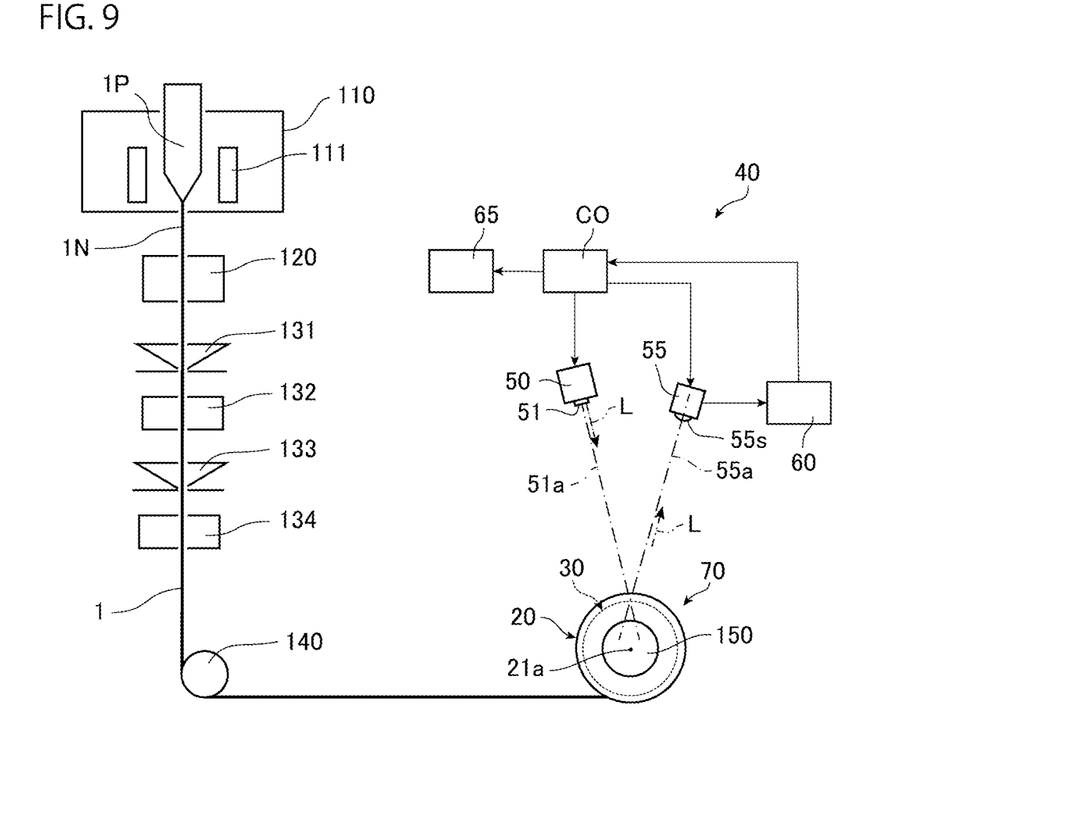
FIG. 9 is a diagram showing the manufacturing of the optical fiber-wound bobbin.

FIG. 8 is a flowchart showing processes of the method for manufacturing the optical fiber-wound bobbin according to one or more embodiments, and FIG. 9 is a diagram showing the manufacturing of the optical fiber-wound bobbin. As shown in FIG. 8, the method for manufacturing the optical fiber-wound bobbin according to one or more embodiments includes an optical fiber manufacturing process P1, a winding process P2, and an inspection process P3.

<Optical Fiber Manufacturing Process P1>

As a preparation for this process, first, a substantially-cylindrical optical fiber preform 1P including a rod-shaped core glass body to be the core 10 and a cladding glass body to be the cladding 11 surrounding the outer peripheral surface of the rod-shaped core glass body is prepared. Then, as shown in FIG. 9, the optical fiber preform 1P is installed in a spinning furnace 110, and a heating unit 111 of the spinning furnace 110 is heated to heat the optical fiber preform 1P. At this time, the lower end portion of the optical fiber preform 1P is in a molten state, and a glass wire is drawn out from the lower end portion. The drawn glass wire solidifies immediately after coming out of the spinning furnace 110, which causes the core glass body to become the core 10 and the cladding glass body to become the cladding 11, thereby obtaining the bare optical fiber 1N including the core 10 and the cladding 11. In this manner, the bare optical fiber 1N drawn from the optical fiber preform 1P passes through a cooling device 120 and is cooled to an appropriate temperature.

Next, a resin to be the inner layer 12a of the coating layer 12 is applied to the outer peripheral surface of the bare optical fiber 1N by a first application unit 131, and the resin is cured by a first curing unit 132 to form the inner layer 12a coating the outer peripheral surface of the cladding 11. In addition, a resin to be the outer layer 12b of the coating layer 12 is applied to the outer peripheral surface of the inner layer 12a by a second application unit 133, and the resin is cured by a second curing unit 134 to form the outer layer 12b covering the outer peripheral surface of the inner layer 12a. As a result, the bare optical fiber 1N becomes the optical fiber 1 shown in FIG. 2. Note that if, for example, the resin to be cured is a curable resin, the first curing unit 132 and the second curing unit 134 are configured to irradiate the resin with ultraviolet rays, and if, for example, the resin to be cured is a thermosetting resin, the first curing unit 132 and the second curing unit 134 are configured to apply heat to the resin.

<Winding Process P2>

This process is a process of winding an optical fiber around a bobbin in multiple layers. As shown in FIG. 9, in one or more embodiments, the direction of the optical fiber 1 is changed by a turn pulley 140, and the bobbin 20 is rotated around the central axis 21a by a winding unit 150 to wind the optical fiber 1 around the bobbin 20, and the optical fiber 1 is wound around the bobbin 20 in a multi-layer winding. In this manner, by winding the optical fiber 1 around the bobbin 20 in multiple layers, the wound body 30 is formed, and the optical fiber-wound bobbin 70 including the bobbin 20 and the optical fiber 1 wound around the bobbin 20 is obtained.

<Inspection Process P3>

This process is an inspection process of inspecting the optical fiber 1 wound around the bobbin 20 by the inspection method for an optical fiber described above. As shown in FIG. 9, in one or more embodiments, the illumination unit 50 and the image data generation unit 55 of the inspection device 40 are disposed above the bobbin 20, and the inspection device 40 inspects the optical fiber 1 during the winding process P2. In one or more embodiments, the illumination unit 50 continuously irradiates the outer peripheral surface 30s of the wound body 30 with the illumination light L during the winding process P2, and the image data generation unit 55 generates image data containing at least a part of the image IM of the illumination light L at predetermined time intervals during the winding process P2. In addition, the inspection unit 60 determines, based on each piece of the image data generated by the image data generation unit 55, whether the stripe pattern SP is projected in the image IM, and an inspection result based on the determination is displayed on the display unit 65. Thus, the inspected optical fiber-wound bobbin 70 is manufactured.

As described above, the inspection method for the optical fiber 1 according to one or more embodiments includes the irradiation step S1, the image data generation step S2, and the inspection step S3. The optical fiber 1 includes the bare optical fiber 1N and the light-transmitting coating layer 12 coating the outer peripheral surface of the bare optical fiber 1N. In the irradiation step S1, the outer peripheral surface 30s of the wound body 30 in which the optical fiber 1 is wound in multiple layers around the bobbin 20 with the illumination light L having directivity. In the image data generation step S2, the illumination light L reflected by the wound body 30 is received, and image data containing at least a part of the image IM of the illumination light L is generated. In the inspection step S3, it is determined, based on the image data, whether the stripe pattern SP in which the state of the illumination light L repeatedly changes along the winding direction of the optical fiber 1 is projected in the image IM.

The inspection device 40 for the optical fiber 1 according to one or more embodiments includes the illumination unit 50, the image data generation unit 55, and the inspection unit 60. The illumination unit 50 irradiates, with the illumination light L having directivity, the outer peripheral surface 30s of the wound body 30, in which the optical fiber 1 including the bare optical fiber 1N and the light-transmitting coating layer 12 coating the outer peripheral surface of the bare optical fiber 1N is wound in multiple layers around the bobbin 20. The image data generation unit 55 receives the illumination light L reflected by the wound body 30, and generates image data containing at least a part of the image IM of the illumination light L. The inspection unit 60 determines, based on the image data, whether a stripe pattern SP in which the state of the illumination light L repeatedly changes along the winding direction of the optical fiber 1 is projected in the image IM.

As described above, the inventor has found that when the interface in the coating layer 12 is a wavy curved surface along the longitudinal direction of the optical fiber 1, the stripe pattern SP in which the state of the illumination light L repeatedly changes along the winding direction of the optical fiber 1 can be projected in the image IM of the illumination light L in the image data generated as described above. Then, in the inspection method and inspection device 40 according to one or more embodiments, it is determined whether the stripe pattern SP is projected in the image data. Accordingly, with the inspection method and inspection device 40 according to one or more embodiments, it is possible to detect a defect that occurs continuously in the longitudinal direction of the optical fiber 1 and that the outer peripheral surface 12s, which is the interface in the coating layer 12, is a wavy curved surface.

Figure 10:
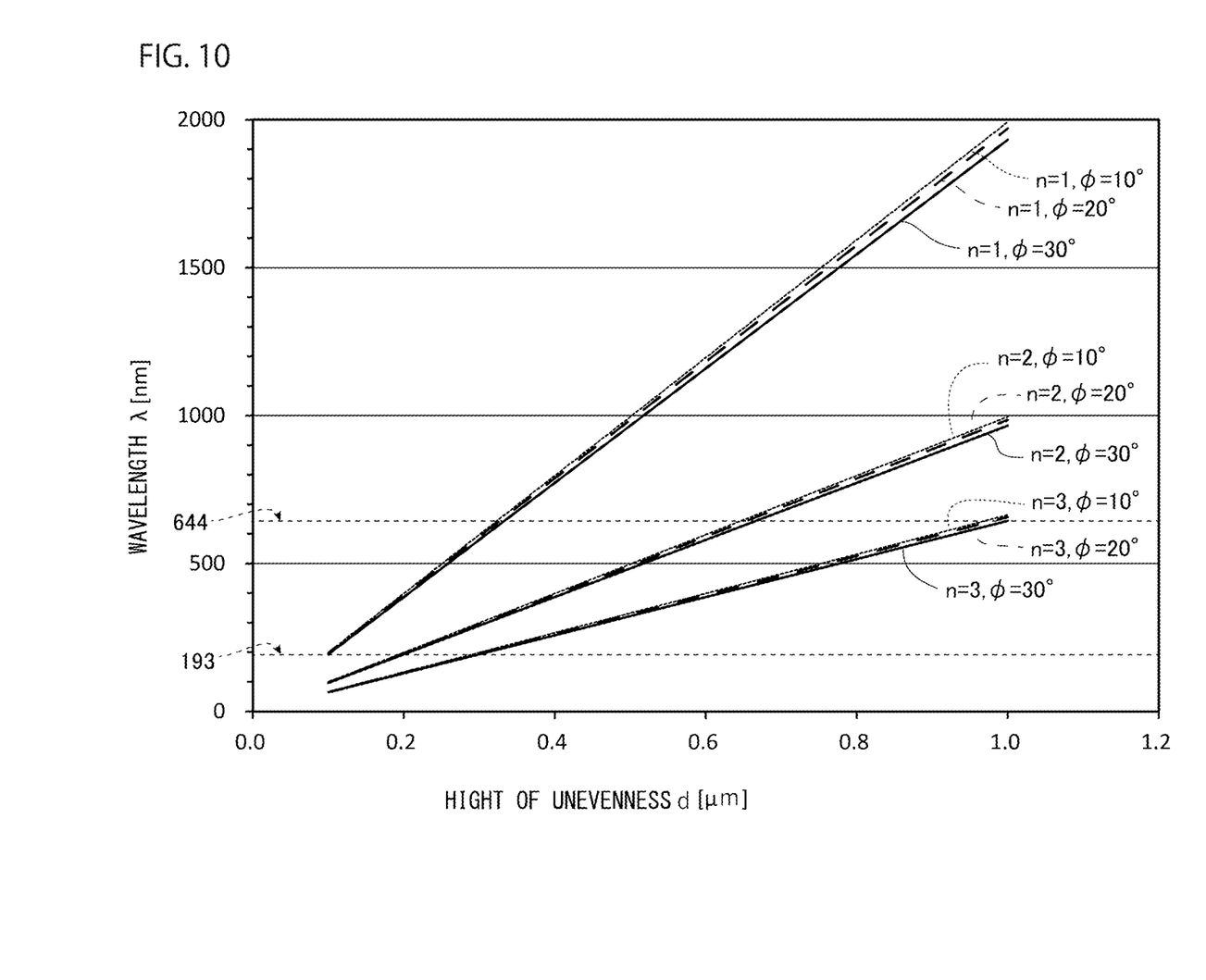
FIG. 10 is a diagram showing the relationship between a wavelength of illumination light and a height of unevenness of an interface in a coating layer.

Here, FIG. 10 is a diagram showing the relationship between the wavelength of the illumination light L and the height d of the unevenness of the interface in the coating layer 12 and showing relationships satisfying the above Expression (3). FIG. 10 shows the relationships between the wavelength $\lambda$ and the height d of the unevenness that satisfies the above Expression (3) when the angle $\varphi$ is 10°, 20°, and 30° in each case of n=1, 2, and 3. In the above Expression (3), $\lambda$ in the case of n=1, d=0.1 (μm), and $\varphi$=30 (°) is approximately 193 nm, and $\lambda$ in the case of n=3, d=1.0 (μm), and $\varphi$=30 (°) is approximately 644 nm. In FIG. 10, the broken lines indicating $\lambda$=193 nm and 644 nm are also shown. FIG. 10 shows, for example, that when the wavelength band of the illumination light L includes a predetermined wavelength band of 193 nm to 644 nm, and $\varphi$=30 (°), and when the outer peripheral surface 12s, which is the interface in the coating layer 12, is a wavy surface including unevenness having a height of 0.1 μm or more and 1.0 μm or less, a stripe pattern SP caused by at least one of first-order interference, second-order interference, and third-order interference can be projected in the image IM of the illumination light L in the image data. Note that first-order interference is for n=1, and second-order interference and third-order interference is for n=2 and 3. Accordingly, when the outer peripheral surface 12s of the coating layer 12 is inspected for a surface including unevenness in this range, the wavelength band of the illumination light L may include the above predetermined wavelength band. The predetermined wavelength band changes depending on the angle $\varphi$. The wavelength band of the illumination light L may include a predetermined wavelength band WB represented by the following Expressions (1) and (2). Note that Expression (1) is a relational expression when n=1 and d=0.1 μm (100 nm) in Expression (3), and Expression (2) is a relational expression when n=3 and d=1.0 μm (1000 nm) in Expression (3). The unit of WB in Expressions (1) and (2) is nm.

$$WB \geq 2 \cdot 0.1 \times 10^3 \cdot \sin((180° - \varphi)/2)/1 \quad (1)$$

$$WB \leq 2 \cdot 1.0 \times 10^3 \cdot \sin((180° - \varphi)/2)/3 \quad (2)$$

Note that the height of the unevenness on the outer peripheral surface 12s is not constant in the longitudinal direction of the optical fiber 1. For example, when the height of the unevenness of the outer peripheral surface 12s includes any in the range of 0.1 μm to 1.0 μm, the height of the unevenness of the outer peripheral surface 12s tends to change in the range of at least 0.1 μm to 1.0 μm. Therefore, if unevenness in a partial range in the range of 0.1 μm to 1.0 μm can be detected, it can be estimated that unevenness of 0.1 μm to 1.0 μm is generated. For example, the wavelength band of the illumination light L may include a specific wavelength band having a width of 200 nm or more in the predetermined wavelength band WB. In this case, unevenness in approximately 50% of the range of 0.1 μm to 1.0 μm can be detected, and whether unevenness of 0.1 μm to 1.0 μm is generated can be generally inspected. Note that the specific wavelength band may have a width of 300 nm or more. In this case, unevenness in approximately 80% of the range of 0.1 μm to 1.0 μm can be detected, and whether unevenness of 0.1 μm to 1.0 μm is generated can be more properly inspected.

In one or more embodiments, the coating layer 12 has a two-layer structure including the inner layer 12a and the outer layer 12b. Therefore, the illumination light L applied to the wound body 30 can be reflected on the interface between the inner layer 12a and the outer layer 12b. Therefore, when the interface between the layers is a wavy curved surface along the longitudinal direction of the optical fiber 1, a stripe pattern caused by the unevenness can be projected in the image IM of the illumination light L reflected by the wound body 30, similarly to the outer peripheral surface 12s. Accordingly, with the inspection method and inspection device 40 according to one or more embodiments, it is possible to detect that the interface between the inner layer 12a and the outer layer 12b constituting the coating layer 12 is a wavy curved surface.

The method for manufacturing the optical fiber-wound bobbin according to one or more embodiments includes the winding process P2 and the inspection process P3. In the winding process P2, the optical fiber 1 including the bare optical fiber 1N and the light-transmitting coating layer 12 coating the outer peripheral surface of the bare optical fiber 1N is wound in multiple layers around the bobbin 20. In the inspection process P3, the optical fiber 1 wound around the bobbin 20 is inspected by the inspection method for the optical fiber 1. The inspection process P3 is performed during the winding process P2. Therefore, with the method for manufacturing the optical fiber-wound bobbin 70 according to one or more embodiments, it is possible to detect a defect in the coating layer 12 of the optical fiber 1 during the winding process P2. Note that the inspection process P3 may start from a state in which the optical fiber 1 is wound in five or more layers, and may start from a state in which the optical fiber 1 is wound in 10 or more layers. This makes it difficult for the outer peripheral surface of the shaft 21 of the bobbin 20 to be seen through, and allows the stripe pattern SP to be clearly projected in the image IM of the illumination light L. Note that the inspection process P3 may be performed after the winding process P2.

The present invention has been described using the above embodiments as an example, but the present invention is not limited thereto.

For example, in the above embodiments, the inspection device 40 including one image data generation unit 55 has been described as an example. However, the inspection device 40 may include a plurality of image data generation units 55. In this case, for example, these image data generation units 55 are disposed in such a manner that the directions in which the illumination light L reflected by the wound body 30 is received are different from each other, and the inspection unit 60 determines whether the stripe pattern SP is projected in the image in the image data generated by each image data generation unit 55. With such a configuration, it is possible to improve the detection accuracy of the inspection device 40. In addition, the inspection device 40 may include a rotating unit that rotates the wound body 30 around the central axis 21a of the shaft 21 of the bobbin 20. With such a configuration, it is possible for the image data generation unit 55 to generate a plurality of pieces of image data with different positions for irradiating the wound body 30 with the illumination light L. Therefore, the inspection unit 60 can determine whether the stripe pattern SP is projected in the image in each piece of image data, and the detection accuracy of the inspection device 40 can be improved.

In addition, in the above embodiments, the image data generation unit 55 that generates two-dimensional image data has been described as an example. However, the image data generation unit 55 may generate one-dimensional image data. Such the image data generation unit 55 is, for example, a line camera with a row of light receiving elements, a light receiving device that includes a light receiving element and moves in a direction non-parallel to the propagation direction of the illumination light L reflected by the wound body 30 to scan the illumination light L, or the like. Note that the stripe pattern SP is a stripe pattern in which the state of the illumination light L repeatedly changes along the winding direction of the optical fiber 1. Therefore, the light receiving elements of the line camera may be arranged in a direction substantially parallel to the winding direction of the optical fiber 1, and the light receiving device may scan in a direction substantially parallel to the winding direction of the optical fiber 1.

In the above embodiments, the inspection unit 60 that determines whether the stripe pattern SP is projected using the learning model has been described as an example. However, the method of determining, by the inspection unit 60, whether the stripe pattern SP is projected is not particularly limited, and the inspection unit 60 may determine whether the stripe pattern SP is projected without using the learning model. For example, the inspection unit 60 may determine whether the stripe pattern SP is projected based on data obtained by performing a predetermined process on the image data generated by the image data generation unit 55. For example, the inspection unit 60 may determine that the stripe pattern SP is projected when there are more than a predetermined number of points exceeding a preset light intensity threshold in the image data. Alternatively, the inspection unit 60 may determine whether the ratio of the average value of the light intensity at a predetermined number of points with higher light intensity to the average value of the light intensity at a predetermined number of points with lower light intensity exceeds a preset threshold within a range provided in advance in the image data, perform the determination on the entire image data while shifting the range, and determine that the stripe pattern SP is projected when the ratio exceeds the threshold. In this manner, it is possible to determine whether the stripe pattern SP is projected in the entire image data.

In the above embodiments, the coating layer 12 having no coloring pigment has been described as an example, but the coating layer 12 may have a coloring pigment. However, when the coating layer 12 does not have a coloring pigment, a defect is easily detected.

In the embodiments described above, the winding process P2 in which the optical fiber 1 manufactured in the optical fiber manufacturing process P1 is wound in multiple layers around the bobbin 20 has been described as an example. However, in the winding process P2, the optical fiber 1 is only required to be wound in multiple layers around a bobbin. For example, the winding process P2 may be a process of winding a part of the optical fiber 1 wound around a bobbin around another bobbin, or may be a process of dividing the long optical fiber 1 into short optical fibers 1. Although illustration is omitted, in such a winding process P2, the optical fiber 1 wound around a first bobbin is delivered by rotating the first bobbin around the central axis by a delivery unit. Then, the optical fiber 1 delivered from the first bobbin is wound around a second bobbin by a winding unit rotating the second bobbin around the central axis, and the optical fiber 1 is wound in multiple layers around the second bobbin. The winding process P2 in this case includes, for example, an acceleration period in which the winding speed increases to a predetermined speed, a steady period in which the winding speed is at a predetermined speed, and a deceleration period in which the winding speed decreases to zero. The inspection process P3 may be performed during the acceleration period, the steady period, or the deceleration period, or after the winding process P2. The inspection process P3 may be performed during the deceleration period, and when the diameter of the wound body 30 including the optical fiber 1 wound around the second bobbin is about 300 mm, the inspection process P3 may be performed in a state where the rotation speed of the second bobbin is 0.1 [round per sec (rps)] or less. When the frame rate of a camera as the image data generation unit 55 is increased, photographing can be performed even during high-speed rotation. However, as the frame rate increases, a flicker phenomenon and insufficient quantity of light tend to occur depending on the configuration of the illumination unit 50, which makes it difficult for the stripe pattern SP to be clearly projected in the captured image. Therefore, the inspection process P3 may be performed as described above. In addition, since a higher frame rate tends to make the camera larger, a camera with a frame rate of 100 fps or lower may be used for practical use. For example, when the diameter of the wound body 30 in the second bobbin is about 300 mm and the rotation speed of the second bobbin is 0.1 rps, the peripheral speed of the outer peripheral surface of the wound body 30 is about 94 mm/s. Here, since the time taken per photographing by a camera with a frame rate of 100 fps is $1/100$s, the movement distance of the outer peripheral surface of the wound body 30 during one photographing is about 0.94 mm, which is 1 mm or less. If the area to be projected in the captured image is, for example, a square with a side length of 300 mm, the ratio of the above movement distance to the side length is about 0.3%, which is sufficiently small to prevent the stripe pattern SP from being difficult to be clearly projected in the captured image.

As described above, one or more embodiments of the present invention can provide an inspection method for an optical fiber, an inspection device for an optical fiber, and a method for manufacturing an optical fiber-wound bobbin that are capable of detecting a defect continuously occurring in a longitudinal direction of an optical fiber, and is expected to be used in the field of optical fiber communication and the like.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:
1. An inspection method for an optical fiber including a bare optical fiber and a light-transmitting coating layer that coats an outer peripheral surface of the bare optical fiber, the inspection method comprising:

irradiating, with illumination light having directivity, an outer peripheral surface of a wound body that includes the optical fiber wound in multiple layers around a bobbin;

receiving the illumination light reflected by the wound body and generating image data containing at least a part of an image of the illumination light; and determining, based on the image data, whether a stripe pattern is projected in the image, wherein the stripe pattern is a state in which the illumination light repeatedly changes along a winding direction of the optical fiber.

2. The inspection method for the optical fiber according to claim 1, wherein an angle formed between a direction in which the wound body is irradiated with the illumination light and a direction in which the illumination light reflected by the wound body is received is 30° or less.

3. The inspection method for the optical fiber according to claim 1, wherein when an angle formed between a direction in which the wound body is irradiated with the illumination light and a direction in which the illumination light reflected by the wound body is received is $\varphi(°)$, a wavelength band of the illumination light includes a specific wavelength band having a width of 200 nm or more in a predetermined wavelength band WB (nm) represented by following expressions (1) and (2):

$$WB \geq 2 \cdot 0.1 \times 10^3 \cdot \sin((180° - \varphi)/2)/1 \quad (1)$$

$$WB \leq 2 \cdot 1.0 \times 10^3 \cdot \sin((180° - \varphi)/2)/3 \quad (2).$$

4. The inspection method for the optical fiber according to claim 3, wherein the specific wavelength band has a width of 300 nm or more in the predetermined wavelength band WB.

5. The inspection method for the optical fiber according to claim 1, wherein the coating layer has a multilayer structure.

6. An inspection device for an optical fiber, the inspection device comprising:

a light source configured to irradiate, with illumination light having directivity, an outer peripheral surface of a wound body, wherein the wound body comprises the optical fiber wound in multiple layers around a bobbin, and the optical fiber includes a bare optical fiber and a light-transmitting coating layer that coats an outer peripheral surface of the bare optical fiber;

an imaging sensor configured to receive the illumination light reflected by the wound body and to generate image data containing at least a part of an image of the illumination light; and an integrated circuit configured to determine, based on the image data, whether a stripe pattern is projected in the image, wherein the stripe pattern is a state in which the illumination light repeatedly changes along a winding direction of the optical fiber.

7. A method for manufacturing an optical fiber-wound bobbin, the method comprising:

winding an optical fiber around a bobbin in multiple layers, wherein the optical fiber includes a bare optical fiber and a light-transmitting coating layer that coats an outer peripheral surface of the bare optical fiber; and inspecting the optical fiber wound around the bobbin by the inspection method for the optical fiber according to claim 1.

8. The inspection method for the optical fiber according to claim 1, wherein in the image data, the stripe pattern is detected on an outer peripheral surface of the coating layer, and the coating layer includes a wavy curved surface along the winding direction of the optical fiber.

9. The inspection method for the optical fiber according to claim 1, wherein an outer peripheral surface of the coating layer includes a wavy surface with an unevenness height of 0.1 μm or more and 1.0 μm or less.

10. The inspection device according to claim 6, wherein the integrated circuit detects, in the image data, the stripe pattern on an outer peripheral surface of the coating layer, and the coating layer includes a wavy curved surface along the winding direction of the optical fiber.

11. The inspection device according to claim 6, wherein an outer peripheral surface of the coating layer includes a wavy surface with an unevenness height of 0.1 μm or more and 1.0 μm or less.

* * * * *